(12) United States Patent
Palmer

(10) Patent No.: US 10,051,796 B2
(45) Date of Patent: Aug. 21, 2018

(54) ORGANIC GREENHOUSE IN A BOX

(71) Applicant: Gerald R. Palmer, Phoenix, AZ (US)

(72) Inventor: Gerald R. Palmer, Phoenix, AZ (US)

( * ) Notice: Subject to any disclaimer, the term of this patent is extended or adjusted under 35 U.S.C. 154(b) by 0 days.

(21) Appl. No.: 15/796,799

(22) Filed: Oct. 29, 2017

(65) Prior Publication Data
US 2018/0116132 A1 May 3, 2018

Related U.S. Application Data

(60) Provisional application No. 62/414,685, filed on Oct. 29, 2016.

(51) Int. Cl.
| | | |
|---|---|---|
| *A01G 9/00* | (2018.01) | |
| *A01G 13/02* | (2006.01) | |
| *A01G 9/14* | (2006.01) | |
| *A01G 9/24* | (2006.01) | |
| *A01G 13/06* | (2006.01) | |
| *A01G 9/26* | (2006.01) | |
| *A01G 9/20* | (2006.01) | |
| *A01G 9/18* | (2006.01) | |

(52) U.S. Cl.
CPC ....... *A01G 13/0231* (2013.01); *A01G 9/1407* (2013.01); *A01G 9/18* (2013.01); *A01G 9/20* (2013.01); *A01G 9/247* (2013.01); *A01G 9/26* (2013.01); *A01G 13/06* (2013.01)

(58) Field of Classification Search
CPC ........ A01G 13/0206; A01G 2013/0218; A01G 13/0231; A01G 13/025; A01G 13/0256; A01G 13/0268; A01G 13/0275; A01G 13/04; A01G 13/043; A01G 2013/046; A01G 13/0287; A01G 9/16; A01G 9/26; A01G 9/227; A01G 9/24; A01G 9/242; A01G 9/247; A01G 9/18; A01G 9/22; A01G 9/1438; A01G 9/20; A01G 13/06
USPC ........... 47/20.1, 21.1, 23.1, 23.2, 24.1, 29.1, 47/29.4, 29.5, 29.6, 29.7, 31, 32.3, 48.5, 47/2, 17, 19.1, 19.2
See application file for complete search history.

(56) References Cited

U.S. PATENT DOCUMENTS

| | | | | |
|---|---|---|---|---|
| 5,179,798 A | * | 1/1993 | Sonagere | A01G 13/0231 47/29.1 |
| 5,813,169 A | * | 9/1998 | Engerman | A01G 9/16 47/17 |
| 6,185,877 B1 | * | 2/2001 | Lloyd | A01G 9/16 47/19.1 |
| 7,637,053 B1 | * | 12/2009 | McAnulty | A01G 13/043 47/23.1 |
| 7,905,051 B2 | * | 3/2011 | Lysa | A01G 9/16 47/21.1 |
| 2004/0134122 A1 | * | 7/2004 | Van Bergen-Henegouwen | A01G 9/227 47/22.1 |

(Continued)

*Primary Examiner* — Trinh T Nguyen
(74) *Attorney, Agent, or Firm* — Mark V. Loen

(57) ABSTRACT

The embodied invention is a framework and expanding cover for a crop row that is designed to provide an enhanced crop growing environment. The framework design utilizes a top and bottom cover with affordable materials that are suitable for large scale production. The design also includes an irrigation, fertilizer, and $CO_2$ injection system that provide an enhanced environment for plants to grow. The entire system is reducible to a small package to better facilitate use in a broad variety of environmental and personal situations.

1 Claim, 3 Drawing Sheets

(56) References Cited

U.S. PATENT DOCUMENTS

Figure 1:
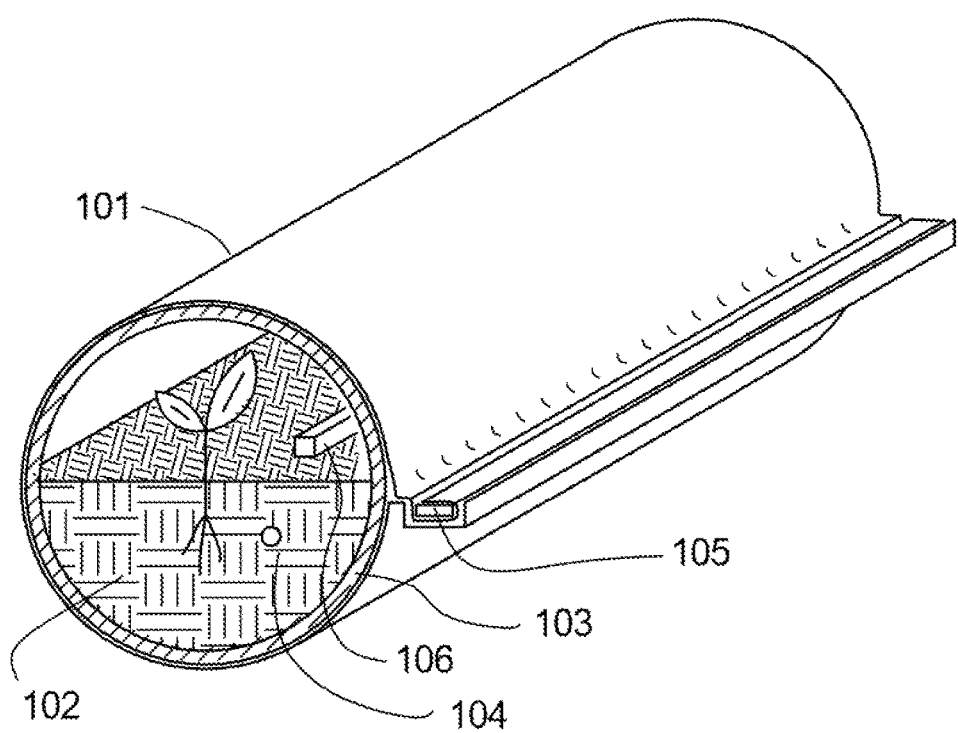

2015/0007495 A1* 1/2015 Tseng ..................... A01G 9/18
 47/17

\* cited by examiner

ORGANIC GREENHOUSE IN A BOX

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed toward affordable greenhouses that provide an enhanced growing environment for plants.

(2) Description of Related Art

U.S. Pat. No. 8,490,327 describes a greenhouse system that is moved between growing areas. However, the elaborate and relative expensive system of rails and rollers, and associated anchoring system, is relatively expensive. Also, the stiff design needed does not grow with a plant, limiting its overall usefulness.

Others have worked in a similar field of hydroponic farming systems. For example, US Publication no 20130255146 discloses a box that is used to control a plant climate. However, the types of materials needed to construct the protective shell around the plants requires expensive and elaborate systems that are unsuitable to mass production farming. Such stiff designs limit the size of a plant, limiting overall usefulness for a variety of plants.

What is needed in the market place is a greenhouse system that expands when the plant grows, is relatively affordable, and provides an environment where a variety of plants will thrive.

BRIEF SUMMARY OF THE INVENTION

The embodied invention is a framework and expanding cover for a crop row that is designed to provide an enhanced crop growing environment. The framework design utilizes a top and bottom cover with affordable materials that are suitable for large scale production. The design also includes an irrigation, fertilizer, and $CO_2$ injection system that provide an enhanced plant growing environment. The entire system is reducible to a small package to better facilitate use in a broad variety of environmental and personal situations.

BRIEF DESCRIPTION OF THE SEVERAL VIEWS OF THE DRAWING(S)

Figure 2A:
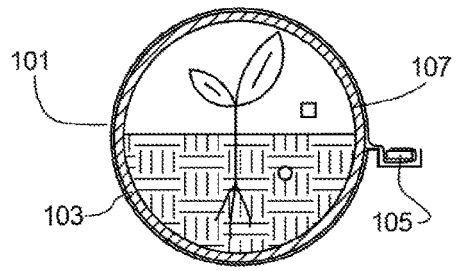
Figure 2B:
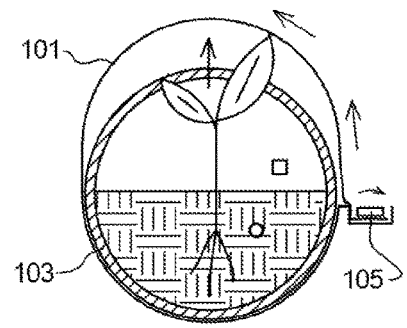
Figure 2C:
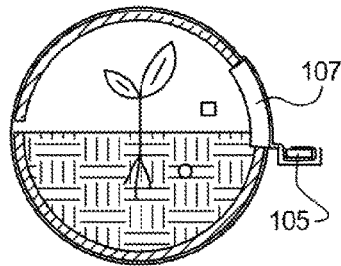
Figure 3:
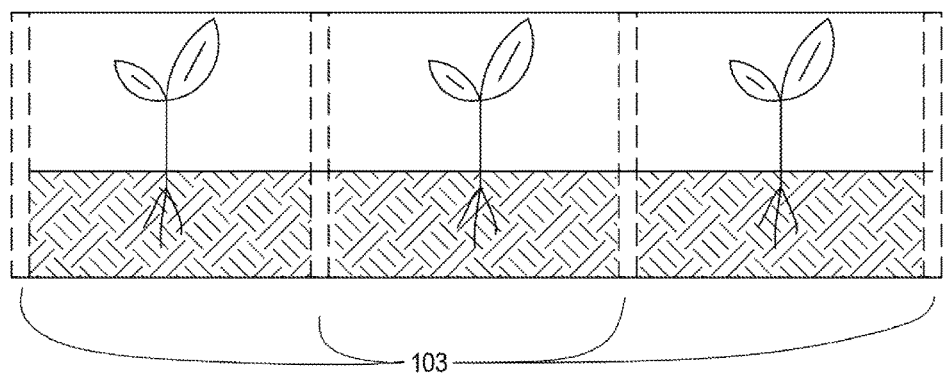
Figure 4:
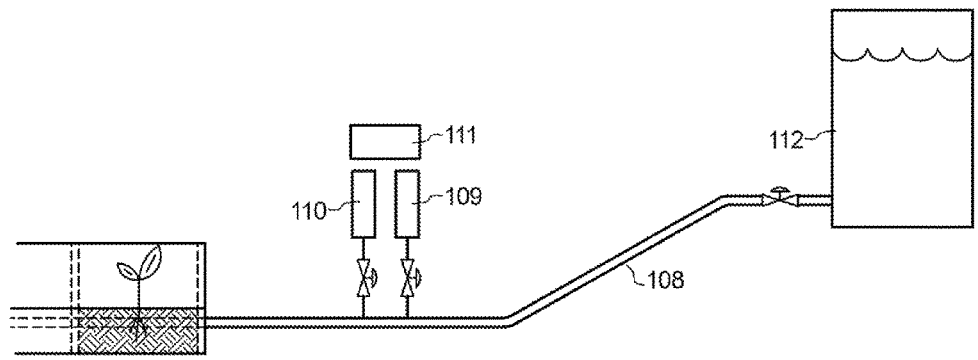

FIG. 1 shows a perspective view of the covered crop row.
FIGS. 2A-2C show a front view of the flexible greenhouse as it expands for plant growth.
FIG. 3 shows how the supporting framework repeats in a particular crop row.
FIG. 4 shows the water, fertilizer, and $CO_2$ system all using the submerged piping that enhances the growing environment of a plant row, or a plurality of plant rows.

DETAILED DESCRIPTION OF THE INVENTION

One embodiment of the conceived invention is for use in urban facilities such as a warehouse. For example, a multi-story structure could be used to grow any number of crop rows providing sunlight can be provided. The crop rows provide a sustainable way for an individual to grow their own food, and possibly sell food into the marketplace.

The conceived invention has numerous benefits including:
1. Extend the gardening season throughout the year
2. Increase the efficiency and amount of food by the following.
    a) Harvest food continually by 'shearing' the outer leaves
    b) Harvest food by pruning plants
        plants and live up to 7 times longer than current harvesting methods
    c) Produce up to ten times the food achieved by current farming methods
    d) Use only as little as 20% of the water needed vs conventional methods
    e) Harvest only food as needed reduces waste, up to ten times production increase
    f) Use lightweight plastic tubing for irrigation, fertilization, and $CO_2$ atmospheric enhancement
    g) Provide up to 3 feet in growing height for a plant.
    h) Provide a crop cover that:
        helps with weeds,
        helps avoid wind driven insects
        allows 30% more food production
        provides a better controlled thermal and moisture environment
        provides frost cover, extending the growing season
3. Capture moisture lost through the leaves of the plants. (It is noted that an acre of corn can lose up to 4,000 gallons per day through transpiration in the leaves on a dry, windy day.)

Some important objectives include:
1. A faster growing plant and a longer crop growing season.
2. Higher humidity levels by using a covered system. A low humidity environment will cause many plant varieties to be stressed.
3. An enhanced ability to survive a drought cycle.
4. Growing food in areas with high saline water. This will allow a farmer to grow a high value added food when less water is needed.

A sizable population of the planet lives on subsistence farming, especially in Africa, parts of Asia, and Latin America. The ability to grow crops food with less water is very helpful to improve the lives of those who live this way. Often, much labor is spent hauling water to a farm for use and for growing food. This system can provide most of the produce needed for a family of four year round (crop row 24' long).

When a cover is used for a crop row, it is important that bees are attracted to the row. The rows can be opened for the entry of bees during critical pollen seasons.

In FIG. 1, a typical embodied crop row has a plastic film cover 101 that is supported by a plastic (or metal) cover support frame 103. The support frame in the general shape of a circle, and is half buried in (or filled with) soil 102. In a preferred embodiment, the soil includes organic fertilizer that provides heat through long term, heat generating, decomposition.

The film cover surrounds the plant and the two film edges are rolled up together and held by a film weight 105. The rolled film and film weight ensure that the crop row has a reasonably tight barrier against bugs and wind. Also, the film weight naturally rotates as the plant grows and pushes up on the film cover, allowing film to slide around the support frame and remain covering the frame.

To facilitate improved growth, a rope light 106 provides lighting during the winter season, and additional heat against frost conditions. Also, a small underground pipe 104 is used to provide water, and fertilizer dissolved in the water to the crops during the night. $CO_2$ is supplied through the pipes during the day to provide an enhanced growing atmosphere that is more conducive to photosynthesis.

As seen in FIGS. 2A-2B, the cover support frame is fixed and when the plant grows and pushes up on the plastic film cover, the plastic film cover expands to allow space for the plant to grow.

As seen in FIG. 2B, the plastic film cover slides over the top of the cover support frame, and is paid off the rotating weight 105. The design provides a way for the film to maintain crop coverage as the room needed for the plant increases.

In an alternate embodiment in FIG. 2C, an elastic sleeve 107 is inserted into the circular plastic support frame to provide a way for the support frame to expand and provide additional stiffness to the support frame. The elastic sleeve is preferably a short section of a small diameter tube that replaces a portion of the plastic wire support frame. To allow the frame to pivot about the elastic sleeve, an opposite frame cutout is illustrated. In this case, both the plastic film cover and the support frame expand to allow space for the plant to grow.

FIG. 3 shows how the support frames 103 are spaced at a distance along the length of the crop row.

FIG. 4 shows a simplified diagram for the water system which is gravity fed from a tank 112 through a pipe 108 to the crop row. Alternately, a pump is used. A $CO_2$ 109 and fertilizer 110 injection system utilizes a micro-controller/timer 111 to provide an enhanced moisture and atmospheric condition for the covered crop row. The fertilizer is preferably a liquid system that readily blends with the watering system. The soil and temperature in a crop row can be monitored and controlled by a farmer through portable instruments, who may then adjust the timing or amount of $CO_2$/fertilizer by changing parameters in the micro-controller. Preferably, the $CO_2$ is fed through the submerged pipe during the day, and water (plus fertilizer) is fed to the submerged pipe during the night time.

Some crops will require re-seeding, but some may be continuously harvested.

In another embodiment, an additional cover (i.e. frost cover) is added between the crop soil 102 and the ground.

For a 24 foot long crop row that is packaged for shipping in a box, such as 32" wide×32" deep×18" tall, the following items will be shipped:
  24 feet of ½" flexible irrigation subsurface piping
  5 Qty pipe connectors for the flexible plastic supports
  5 Qty support frames (both upper and lower)
  2 Qty ¼×¾"×24 feet of aluminum spacer strip with holes every 3 feet
  100 square ft of 3.5 mill black plastic with drainage perforations for the lower cover
  120 square ft of fabric frost cover with open perforations
  10 Qty expansion elastic pieces
  10 Qty film weights
  10 Qty screws (stainless steel)
  Staples
  ½" sized rope light emitter 24 feet long (or incandescent rope) with optional power supply
  Micro-Controller
  $CO_2$ cartridge or dry mix generator
  Liquid fertilizer injection tank and valve While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A covered greenhouse with a predetermined length comprising:
  A. a plurality of film support frames,
  B. wherein said film support frames are designed to be spaced substantially 3 feet apart,
  C. wherein said film support frames are each substantially in the shape of a circle with substantially a same circular diameter,
  D. a plastic film cover that is designed to surround said film support frames,
  E. a film weight, wherein said film weight is designed to rotate and unwind a portion of said plastic film encompassing said film support frames,
  F. wherein an upper portion of said film cover is designed to lift upwardly from plant growth pressure when said film weight unwinds, wherein a substantially half portion of said film is buried in soil,
  G. a predetermined length of plastic pipe, wherein said plastic pipe incorporates evenly spaced holes,
  H. a predetermined length of lighting strip,
  I. a micro-controller, wherein said micro-controller is designed to control:
    1. a water supply through said predetermined length of plastic pipe,
    2. a $CO_2$ injector,
    3. a liquid fertilizer injector,
    and
  J. said covered greenhouse is shippable by mail.

* * * * *